United States Patent
Gentsch

(10) Patent No.: US 10,549,371 B2
(45) Date of Patent: Feb. 4, 2020

(54) METHOD OF MANUFACTURING A CERAMIC METALLIZATION FOR CERAMIC METAL TRANSITION

(71) Applicant: ABB Technology AG, Zurich (CH)

(72) Inventor: Dietmar Gentsch, Ratingen (DE)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 15/064,653

(22) Filed: Mar. 9, 2016

(65) Prior Publication Data
US 2016/0184913 A1 Jun. 30, 2016

Related U.S. Application Data

(63) Continuation of application No. PCT/EP2014/002539, filed on Sep. 18, 2014.

(30) Foreign Application Priority Data

Sep. 20, 2013 (EP) ..................................... 13004596

(51) Int. Cl.
*H01H 11/00* (2006.01)
*B23K 1/00* (2006.01)
(Continued)

(52) U.S. Cl.
CPC .......... *B23K 1/0016* (2013.01); *C04B 37/026* (2013.01); *C21D 9/50* (2013.01);
(Continued)

(58) Field of Classification Search
CPC ........ C04B 2237/121; H01H 33/66207; H01H 2033/66215; B23K 1/0016;
(Continued)

(56) References Cited

U.S. PATENT DOCUMENTS 3,615,920 A * 10/1971 Talento ................ B23K 35/304
148/517
3,825,789 A * 7/1974 Harris .................. H01H 1/0203
218/130
(Continued)

FOREIGN PATENT DOCUMENTS

RU 2350673 C1 3/2009

OTHER PUBLICATIONS

A. Roth: "25.3 Possibility of Brazing Ceramic-Metal Seals" In: Vacuum Sealing Techiniques, Jan. 1, 1994 (Jan. 1, 1994), American Vacuum Society Classics, XP055153289, pp. 220-221.
(Continued)

*Primary Examiner* — Thiem D Phan
(74) *Attorney, Agent, or Firm* — Leydig, Voit & Mayer, LTD.

(57) ABSTRACT

A method of manufacture of a ceramic metallization for ceramic metal transition, and ceramic metal transition itself, for the use in low, medium and high-voltage techniques, which may avoid a brazing foil, and/or overcome problems with the use of thin brazing foils, and/or to make the manufacture easier, but also more effective, wherein, on top of the Ni-layer will be placed an Ag-layer as a third layer, and then the metal part will be laid on top and connected by brazing or tempering.

11 Claims, 1 Drawing Sheet

(51) Int. Cl.
*C04B 37/02* (2006.01)
*C23C 28/02* (2006.01)
*H01H 33/662* (2006.01)
*C21D 9/50* (2006.01)

(52) U.S. Cl.
CPC ..... *C23C 28/021* (2013.01); *H01H 33/66207* (2013.01); *C04B 2237/123* (2013.01); *C04B 2237/125* (2013.01); *C04B 2237/343* (2013.01); *C04B 2237/74* (2013.01); *Y10T 29/49105* (2015.01)

(58) Field of Classification Search
CPC .............. B23K 35/3006; C23C 28/021; H05K 2201/10053; Y10T 29/302; Y10T 403/479; Y10T 428/1291; Y10T 29/49105
USPC .................. 29/825, 622, 831, 840, 874, 878
See application file for complete search history.

(56) References Cited

U.S. PATENT DOCUMENTS

| | | | |
|---|---|---|---|
| 4,996,111 A | 2/1991 | Do-Thoi et al. | |
| 7,445,850 B2 * | 11/2008 | Makino | H01H 33/66207 428/469 |
| 2004/0112945 A1 | 6/2004 | Wolfgram et al. | |
| 2010/0277873 A1 * | 11/2010 | Eisele | H01L 23/49568 361/728 |

OTHER PUBLICATIONS

C. A. Walker et al: "Comparing Metal-Ceramic Brazing Methods", 43 Welding Journal Molybdenum-Manganese/Nickel Plating Method, Oct. 1, 2008 (Oct. 1, 2008), pp. 43-50, XP055153279, Retrieved from the Internet: URL: http://www.aws.org/bsmc/wj200810_43.pdf.

Liu G W et al: "Bonding Mechanisms and Shear Properties of Alumina Ceramic/Stainless Steel Brazed Joint", Journal of Materials Engineering and Performance, Springer US, Boston, vol. 20, No. 9, Jan. 26, 2011 (Jan. 26, 2011), pp. 1563-1568, XP019984928.

Wang Juan, et al., "Brazing and Diffusion Welding Technique", Chemical Industry Press, Mar. 31, 2013, p. 256.

Li Songlin, et al., "Material Chemistry", Chemical Industry Press, Jan. 31, 2008, pp. 247-248.

C.A. Walker, et al., "Comparing Metal-Ceramic Brazing Methods", Brazing & Soldering Today, vol. 87, No. 10, Dec. 31, 2008, pp. 43-50.

G. W. Liu, et al., "Bonding Mechanisms and Shear Properties of Alumina Ceramic/Stainless Steel Brazed Joint", Journal of Materials Engineering and Performance, vol. 20, No. 9, Sep. 17, 2011, pp. 1563-1568.

Chinese Office Action dated Apr. 1, 2017, Chinese Patent Office, pages.

* cited by examiner

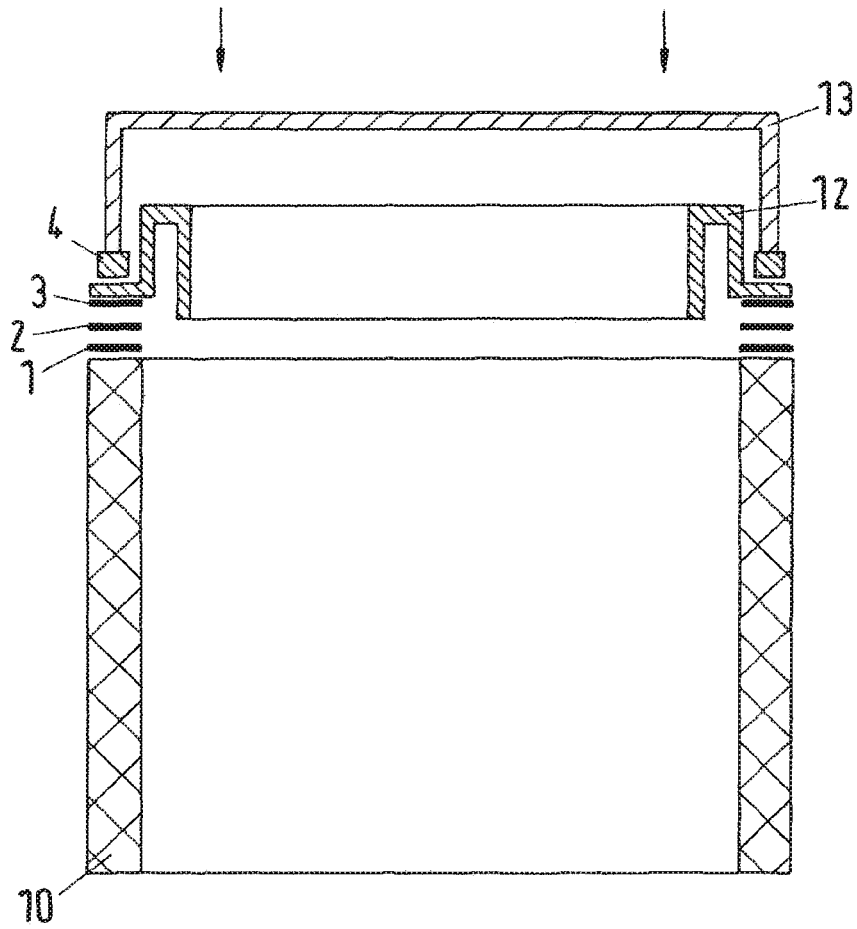

METHOD OF MANUFACTURING A CERAMIC METALLIZATION FOR CERAMIC METAL TRANSITION

CROSS-REFERENCE TO RELATED APPLICATIONS

This application is a continuation of International Application No. PCT/EP2014/002539, filed on Sep. 18, 2014, claiming benefit to European Patent Application No. 13 004 596.6, filed on Sep. 20, 2013, each of which is incorporated in its entirety herein. The International Application was published in German on Mar. 26, 2015, as WO 2015/039757 A1 under PCT Article 21 (2).

FIELD

The invention relates to a method of manufacture of a ceramic metallization for ceramic metal transition, and ceramic metal transition itself, for the use in low, medium and high-voltage techniques.

BACKGROUND

Methods of manufacture of a ceramic metallization for ceramic metal transition for the use for components of low-, medium- and high voltage switches or switching means, starting with a ceramic body mainly consisting $Al_2O_3$ material, which is covered with a first layer in standard application of MoMn (or Tungsten (W)) and a second layer of Ni. On the Ni-layer, usually a brazing foil will be layed on top. Then follows the metal part, which will be brazed then to the ceramic body in the region of the aforesaid layers.

Normally brazing foils are necessary to use.

In order to get a gas tight connection to the ceramic body of a vacuum interrupter in general brazing technology is used. The brazing process is done during the standard manufacturing process here the degassing process of the components and at the latest step, the brazing process. To perform the brazing an additional brazing foil has to be added, and this on both sides of the ceramic body.

SUMMARY

An aspect of the invention provides a method of manufacturing a ceramic metallization for ceramic metal transition for the use for components of a low-, medium-, and/or high voltage device, switch or switching unit by which a ceramic body is connected to a metal part, the method comprising: covering a ceramic body comprising a $Al_2O_3$ material at least with a first layer comprising MoMn and a second layer comprising Ni; placing a third layer comprising Ag on top of the Ni-layer; then laying the metal part on top of the third layer; and connecting the metal part to one or more of the layers by brazing and/or tempering.

BRIEF DESCRIPTION OF THE DRAWINGS

The present invention will be described in even greater detail below based on the exemplary figure. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawing which illustrates the following:

FIG. 1 shows a part of a vacuum interrupter.

DETAILED DESCRIPTION

So it is an aspect of the invention, to avoid the brazing foil, in order overcome problems with the use of thin brazing foils, to make the manufacture easier, but also much more effective.

So a solution, given by an aspect of the invention is, that on top of the Ni-layer will be placed an Ag-layer as a third layer, and then the metal part will be laid on top and being connected by brazing or tempering.

This avoids completely the use of brazing foils.

An advantage is that the separate use of brazing foils for all ceramic metal connections can be avoided. This reduces manufacture costs, by reduction of used element.

In a further embodiment, the brazing step is proceeded under a vacuum, inert or active gas (hydrogen) environment in-situ by tempering.

In a first advantageous alternative, the Ag-layer will be placed galvanically.

In a second advantageous alternative, the Ag-layer will be placed by cold gas spraying.

According to a constructional element of a switch for low-, medium- or high voltage use, the transition area consist of a layer system, with a first layer of MoMn or tungsten and a second layer of Ni and a final layer of Ag on top of the Ni-layer, which is directly connected to the metal part by brazing or tempering in situ.

A great advantage of the invention results by that the constructional element is a vacuum interrupter or device, in which the caps (12) are connected gastight to the ceramic body of the vacuum interrupter/device by the aforesaid features.

An embodiment of the invention is shown in the drawing.

FIG. 1 shows a part of a vacuum interrupter (100). The main part is a cylindrical ceramic body (10). At the edges of the cylindrical body, the edges are covered with a layer system of different metals. The ceramic body (10) is usually made of an $Al_2O_3$ (aluminum oxide) ceramic.

So the first layer (1) to deposit on the ring end surfaces of the cylindrical ceramic body is of MoMn (molybdenum manganese) alloy. The second layer (2) on top is of Ni (Nickel).

The next step is to deposit a silver (Ag) layer (3) on top of it.

Then the cap 13 having metallic ring 4 is placed on top of the upper Ag-Layer (3), and then by tempering or brazing, that means temperature proceeding at a temperature over an alloying point, resulting in an in-situ alloying process by diffusion of the metals in that region.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

The invention claimed is:

1. A method of manufacturing a ceramic metallization for a ceramic metal transition for use with components of a low-, medium-, and/or high-voltage device, switch, or switching unit by which a ceramic body is connected to a metal part, the method comprising:
    covering a ceramic body, comprising a $Al_2O_3$ material, with at least a first layer comprising MoMn and a second layer comprising Ni;
    placing a third layer comprising Ag on top of the second layer;
    laying the metal part on top of the third layer; and
    connecting the metal part to one or more of the first, second, and third layers at a connecting region,
    wherein the connecting comprises brazing, and the brazing comprises in-situ tempering under an inert gas environment, and
    wherein the connecting takes place at a temperature above an alloying point so as to provide an in-situ alloying process by diffusion of metals in the connecting region.

2. The method of claim 1, wherein the ceramic body mainly comprises the $Al_2O_3$ material.

3. The method of claim 1, wherein the connecting connects the metal part to the ceramic body.

4. The method of claim 1, wherein the first layer mainly comprises MoMn.

5. The method of claim 1, wherein the first layer comprises tungsten.

6. The method of claim 1, wherein the second layer mainly comprises Ni.

7. The method of claim 1, wherein the third layer mainly comprises Ag.

8. The method of claim 1, wherein the placing of the third layer is at least partially carried out galvanically.

9. The method of claim 1, wherein the placing of the third layer is at least partially carried out by cold gas spraying.

10. A method of manufacturing a ceramic metallization for a ceramic metal transition for use with components of a low-, medium-, and/or high-voltage device, switch, or switching unit by which a ceramic body is connected to a metal part, the method comprising:
    covering a ceramic body, comprising a $Al_2O_3$ material, with at least a first layer comprising MoMn and a second layer comprising Ni;
    placing a third layer comprising Ag on top of the second layer;
    laying the metal part on top of the third layer; and
    connecting the metal part to one or more of the first, second, and third layers at a connecting region,
    wherein the connecting comprises brazing, and the brazing comprises in-situ tempering under an active gas environment, and
    wherein the connecting takes place at a temperature above an alloying point so as to provide an in-situ alloying process by diffusion of metals in the connecting region.

11. A method of manufacturing a ceramic metallization for a ceramic metal transition for use with components of a low-, medium-, and/or high-voltage device, switch, or switching unit by which a ceramic body is connected to a metal part, the method comprising:
    covering a ceramic body, comprising a $Al_2O_3$ material, with at least a first layer comprising MoMn and a second layer comprising Ni;
    placing a third layer comprising Ag on top of the second layer;
    laying the metal part on top of the third layer; and
    connecting the metal part to one or more of the first, second, and third layers at a connecting region,
    wherein the connecting comprises brazing, and the brazing comprises in-situ tempering under a hydrogen environment, and
    wherein the connecting takes place at a temperature above an alloying point so as to provide an in-situ alloying process by diffusion of metals in the connecting region.

* * * * *